United States Patent Office 2,831,871
Patented Apr. 22, 1958

2,831,871

PROCESS FOR PRODUCING DIRECT DYEING VAT BLACK DYESTUFF

Benjamin F. Robinson, Mount Holly, N. C., assignor to Southern Dyestuff Corporation, a corporation of North Carolina No Drawing. Application October 18, 1956
Serial No. 616,605

5 Claims. (Cl. 260—353)

This invention relates to direct dyeing vat black dyestuff and more particularly to an improved process therefor. When used for dyeing cotton cloth or other textile materials, this vat black dyestuff does not require any after-treatment of the dyed material to develop the color and is prepared according to a different procedure from that heretofore used.

The process of this invention comprises treating compounds of the dibenzanthrone series in a solution of sulfuric acid with sodium, potassium or ammonium nitrate or their equivalents, in carefully controlled proportions and under proper temperature conditions.

The concentration of the sulfuric acid may vary generally from about 75% to 100% strength, and the temperature range is from approximately 0° C. to about 75° C., depending upon the concentration of the sulfuric acid.

The following are illustrative but non-limiting examples of the process of my invention, the parts specified being by weight.

*Example 1*

46 parts of dibenzanthrone (technically pure) are dissolved in 500 parts of 98% sulfuric acid, and stirred until the mixture is homogeneous. 10 parts of crystalline sodium nitrate are added and the mixture stirred for a period of four hours while the temperature is maintained at 0–3° C. by external cooling. The nitration mixture is drowned in 5,000 parts of water. The compound precipitates and is recovered by filtering, and is washed free from acid.

*Example 2*

The same procedure as described under Example 1 above is carried out, but in this instance the strength of the sulfuric acid is 95%, the amount of sodium nitrate used is 11 parts, and the temperature is maintained at about 10–15° C.

*Example 3*

In this case, the process as described in Example 1 above is used except that the strength of the sulfuric acid is 77.5%, the amount of sodium nitrate is 11 parts, and the temperature is allowed to rise to about 70–75° C.

*Example 4*

In this case, the process as described in Example 1 above is used except that 46 parts of isodibenzanthrone may be used in place of dibenzanthrone.

Dibenzanthrone and isodibenzanthrone containing halogen substituents can be used in the process of my invention in the same manner as dibenzanthrone and isodibenzanthrone. These halogenated compounds may be produced by any of certain well-known commercial methods of preparation, as set forth below.

Bromo-dibenzanthrone may be produced by direct bromination with bromine of dibenzanthrone in solution in concentrated sulfuric or chloro-sulfonic acid. Brominated dibenzanthrone compounds obtained in this manner usually contain from about 15% to about 28% bromine, depending upon the conditions under which the reaction is carried out, and is considered to be mono-bromo-dibenzanthrone or di-bromo-dibenzanthrone, or a mixture thereof.

Chloro-dibenzanthrone may be produced by direct chlorination with chlorine of dibenzanthrone in solution in a suitable solvent such as nitro benzine or trichloro benzine. Chlorinated dibenzanthrone compounds obtained in this manner, usually contain about 7% to about 13½% chlorine, depending upon the conditions under which the reaction is carried out, and are considered to be mono- or di-chloro-isodibenzanthrone.

Di-bromo-isodibenzanthrone may be produced by alcoholic fusion of 9,9' di-bromo 3,3' dibenzanthronyl diselenide.

The following additional non-limiting examples illustrate the process of the present invention, using halogenated dibenzanthrone compounds.

*Example 5*

The process as described in Example 1 is carried out, except that 49 parts of mono-chloro-dibenzanthrone or 49 parts of mono-chloro-isodibenzanthrone are used instead of the 46 parts of dibenzanthrone.

*Example 6*

The process of Example 1 is repeated, except that 52.5 parts of di-chloro-dibenzanthrone or 52.5 parts of di-chloro-isodibenzanthrone are used instead of the 46 parts of dibenzanthrone.

*Example 7*

The process of Example 1 is repeated, except that 53.5 parts of mono-bromo-dibenzanthrone or 53.5 parts of mono-bromo-isodibenzanthrone are used instead of the 46 parts of dibenzanthrone.

*Example 8*

The process of Example 1 is repeated, except that 62 parts of di-bromo-dibenzanthrone or 62 parts of di-bromo-isodibenzanthrone are used instead of the 46 parts of dibenzanthrone.

The dyestuff prepared by the above Examples 1–8, inclusive, dyes cellulose fibers from the ordinary hydrosulfite vat deep reddish to greenish shades of black, directly and without further treatment. These dyes exhibit excellent dyeing characteristics and fastness properties.

Among the various halogenated compounds of dibenzanthrone and isodibenzanthrone, the following are typical specific preferred compounds:

16 mono-chloro-dibenzanthrone
16 mono-bromo-dibenzanthrone
16, 17 di-chloro-dibenzanthrone
15, 18 di-chloro-dibenzanthrone
16, 17 di-bromo-dibenzanthrone
6 chloro-iso-dibenzanthrone
6 bromo-iso-dibenzanthrone
6, 15 di-chloro-iso-dibenzanthrone
6, 15 di-bromo-iso-dibenzanthrone
2, 11 di-bromo-iso-dibenzanthrone The compounds listed above are numbered according to the Perylene System, which is shown below.

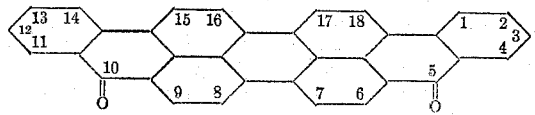

Dibenzanthrone
(Dinaphtho perylene-5,10 dione)

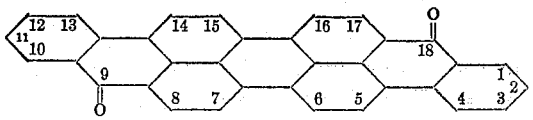

Isodibenzanthrone (Dinaphtho perylene-9,18 dione)

In addition to the above mentioned compounds, dibenzanthrone and isodibenzanthrone compounds containing fluorine substituents may be used, and the same desirable results obtained.

Similarly, whereas the process has been described above with particular reference to nitrates of sodium, potassium or ammonium, which are the preferred reagents, it has been found that other compounds containing the nitrate group ($NO_3$) may be utilized, including specifically the following:

Mercuric nitrate—$Hg(NO_3)_2 \cdot H_2O$
Copper nitrate—$Cu(NO_3)_2 \cdot 3H_2O$
Magnesium nitrate—$Mg(NO_3)_2 \cdot 6H_2O$
Urea nitrate—$NH_2CONHNO_3$
Cerium ammonium nitrate—$(NH_4)_2CE(NO_3)_6 \cdot 6H_2O$
Aluminum nitrate—$Al(NO_3)_3 \cdot 9H_2O$
Bismuth nitrate—$Bi(NO_3)_3 \cdot 5H_2O$
Lithium nitrate—$LiNO_3$
Amyl nitrate—$C_5H_{11}NO_3$
Calcium nitrate—$Ca(NO_3)_2$ This application is a continuation-in-part of my co-pending application Serial No. 424,272, filed April 19, 1954, and now abandoned.

Various other modifications and changes may be made in the above described materials, procedures and conditions without departing from the scope of my invention as defined in the appended claims.

I claim:

1. A process for producing direct dyeing vat black dyestuff comprising treating a compound selected from the group consisting of dibenzanthrone, isodibenzanthrone, bromo-dibenzanthrone, bromo-iso-dibenzanthrone, chloro-dibenzanthrone, chloro-iso-dibenzanthrone, fluoro-dibenzanthrone, and fluoro-iso-dibenzanthrone, with a solution of sulfuric acid of 75% to 100% strength and a nitrate, at a temperature between 0° C. and 75° C., diluting with water, filtering and washing free from acid.

2. A process for producing direct dyeing vat black dyestuff comprising treating a compound selected from the group consisting of dibenzanthrone, isodibenzanthrone, bromo-dibenzanthrone, bromo-iso-dibenzanthrone, chloro-dibenzanthrone, chloro-iso-dibenzanthrone, fluoro-dibenzanthrone, and fluoro-iso-dibenzanthrone, with a solution of sulfuric acid of 75% to 100% strength and a nitrate selected from the group consisting of nitrates of alkali metals and ammonia, and in the absence of a substantial excess quantity of said nitrate, at a temperature between 0° C. and 75° C., diluting with water, filtering and washing free from acid.

3. A process as defined in claim 1 and in which the nitrating agent is a caustic alkali crystalline nitrate.

4. A process as defined in claim 1 and in which the temperature is in the range of about 0° C. to 5° C.

5. A process as defined in claim 1, in which the ratio of said compound to said nitrate is approximately 1:1.1.

References Cited in the file of this patent
UNITED STATES PATENTS

| | | |
|---|---|---|
| 2,265,721 | Deinet | Dec. 9, 1941 |
| 2,767,197 | Martin et al. | Oct. 16, 1956 |